(12) United States Patent
Goichberg et al.

(10) Patent No.: US 10,826,635 B2
(45) Date of Patent: *Nov. 3, 2020

(54) SYNCHRONIZATION OF ADAPTIVE FILTER SWITCHING AND CHANNEL EQUALIZATION IN FULL DUPLEX (FDX) CABLE MODEMS

(71) Applicant: Intel Corporation, Santa Clara, CA (US)

(72) Inventors: Nathan Goichberg, Ashdod (IL); Shaul Shulman, Ramat Gan (IL); Thushara Hewavithana, Chandler, AZ (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,645

(22) Filed: Feb. 13, 2019

(65) Prior Publication Data
US 2020/0021380 A1 Jan. 16, 2020

Related U.S. Application Data

(63) Continuation of application No. 15/717,285, filed on Sep. 27, 2017, now Pat. No. 10,243,681.
(Continued)

(51) Int. Cl.
*H04L 5/14* (2006.01)
*H04J 3/06* (2006.01)
(Continued)

(52) U.S. Cl.
CPC .......... *H04J 3/0682* (2013.01); *H04L 5/0091* (2013.01); *H04L 5/14* (2013.01);
(Continued)

(58) Field of Classification Search
CPC ..... H04J 3/0682; H04L 25/03057; H04L 5/14
See application file for complete search history.

(56) References Cited

U.S. PATENT DOCUMENTS

| 6,791,995 B1 | 9/2004 | Azenkot et al. |
| 7,924,752 B2 * | 4/2011 | Tackin .................. H04M 7/006 370/286 |

(Continued)

FOREIGN PATENT DOCUMENTS

| EP | 2991248 A2 | 3/2016 |
| WO | 2017/030660 A1 | 2/2017 |

OTHER PUBLICATIONS

Search and Examination Report dated Jan. 25, 2019 for UK Application No. GB1813325.6.
(Continued)

*Primary Examiner* — Dac V Ha
(74) *Attorney, Agent, or Firm* — Maschoff Brennan

(57) ABSTRACT

Synchronizing methods and architectures for cable modems to transmit and receive Full Duplex (FDX) resource block allocations (RBAs) using filter switching and coordinated updating of equalization coefficients. A cable modem including a block of switchable filters, an analog front end (AFE) and a PHY/MAC System on a Chip (SoC) tuner to, at least in part, provide signals to switch the switchable filters in accordance with the RBA changes and synchronize updating tuner equalizations to match filter switching in a coordinated manner by marking received data at the AFE.

20 Claims, 7 Drawing Sheets

Related U.S. Application Data

(60) Provisional application No. 62/547,498, filed on Aug. 18, 2017.

(51) Int. Cl.
*H04L 25/03* (2006.01)
*H04L 12/28* (2006.01)
*H04L 5/00* (2006.01)

(52) U.S. Cl.
CPC ...... *H04L 12/2801* (2013.01); *H04L 12/2898* (2013.01); *H04L 25/03057* (2013.01)

(56) References Cited

U.S. PATENT DOCUMENTS

| | | | |
|---|---|---|---|
| 8,385,305 B1 * | 2/2013 | Negus | H04J 1/00 370/338 |
| 2002/0061012 A1 | 5/2002 | Thi et al. | |
| 2002/0136203 A1 | 9/2002 | Liva et al. | |
| 2003/0058959 A1 | 3/2003 | Rafie et al. | |
| 2007/0263754 A1 | 11/2007 | Currivan et al. | |
| 2016/0182134 A1 | 6/2016 | Kol et al. | |
| 2017/0093555 A1 | 3/2017 | Hamzeh et al. | |
| 2017/0237450 A1 | 8/2017 | Knutson | |
| 2017/0373916 A1 | 12/2017 | Oh et al. | |

OTHER PUBLICATIONS

Notice of Allowance dated Oct. 22, 2018 for U.S. Appl. No. 15/717,285.

Non-Final Office Action dated Jun. 7, 2018 for U.S. Appl. No. 15/717,285.

* cited by examiner

SYNCHRONIZATION OF ADAPTIVE FILTER SWITCHING AND CHANNEL EQUALIZATION IN FULL DUPLEX (FDX) CABLE MODEMS

CROSS-REFERENCE TO RELATED APPLICATIONS

This application is a continuation of U.S. application Ser. No. 15/717,285 filed on Sep. 27, 2017, which claims benefit of U.S. Patent Application Ser. No. 62/547,498 filed Aug. 18, 2017 the contents of which are incorporated by reference in their entirety.

FIELD

Embodiments of the present invention relate generally, but not limited to, communication architectures and methods for handling full-duplex (FDX) cable modem signals with switched filtering and balancing equalization coefficients of a receiver based on the filter selected.

BACKGROUND

In certain, non-limiting embodiments, cable communication systems such as those defined by Data Over Cable Service Interface Specification (DOCSIS) 3.1 FDX, although the inventive embodiments are not limited to any specific defined protocols. DOCSIS 3.1 FDX specifications impose additional challenges on the filtering design of that did not exist in prior versions of the standard.

DOCSIS 3.1 FDX allows dynamic resource block allocation (RBA) for downstream and upstream in the FDX band. Meaning that a channel that is receiving may be changed and allocated to transmission and vice versa. In order to cope with the changed electrical characteristics due to the filter switching for RBA changes, it may be desirable to change the digital compensation for the channel response (i.e., adjust equalizer coefficients) according to the changes in the filter configuration.

By way of example only, consider a rudimentary case of a system that uses three resource block allocations (RBAs), such as when two RBAs, also referred to herein as "channels," are allocated to downstream and one RBA to the upstream. If, for example, the network changes the resource block allocation of the cable modem tuner to one downstream channel and two upstream channels, i.e., one of the downstream channel allocations is changed to an upstream channel, the filtering at the receiver will change, as well as does the likely need to adjust the equalizer coefficients to match electrical changes due to an alternate filter input. As the downstream is frequently receiving most of the time, the filter switching due to a resource allocation change will likely happen while the CM is receiving real data. Due to filter design and matching, the impedance and the frequency response that is seen at the tuner input, after filtering, will change with RBA changes. This may cause errors in signal demodulation as the change may affect the amplitude and phase of the signal at the analog to digital controller (ADC) input if no compensations for these changes are made at the same time, or nearly simultaneously, in time.

If the update of equalization coefficients is not well timed to match the filter switch, then there very likely will be a period of time when inefficient or incorrect equalizer coefficients are used and thus degrade performance of the receiver in receiving the downlink channel, including possible data loss. It would therefore be desirable to have a method/process and/or architecture to provide synchronization of filter switching and equalizer coefficient updates due to changes in RBAs, which may be necessary in DOCSIS 3.1 FDX operation or similar uplink/downlink communication systems using FDX filter switching.

BRIEF DESCRIPTION OF THE DRAWING FIGURES

Certain circuits, logic operation, apparatuses and/or methods will be described by way of non-limiting example only, in reference to the appended Drawing Figures in which.

DETAILED DESCRIPTION OF THE INVENTION

While reference to example embodiments of the invention may be made to cable modems and related specifications, such as DOCSIS® 3.1 by Cable Television Laboratories, Inc., the filter switching and adaptive coefficient equalization techniques of the inventive embodiments are not limited thereto and may be used in any protocols, applications or architectures where similar principles may be applied and their use provides similar advantages. Thus the specific description herein is provided only in context of one example implementation and the claims within are in no way limited thereby.

Figure 1:
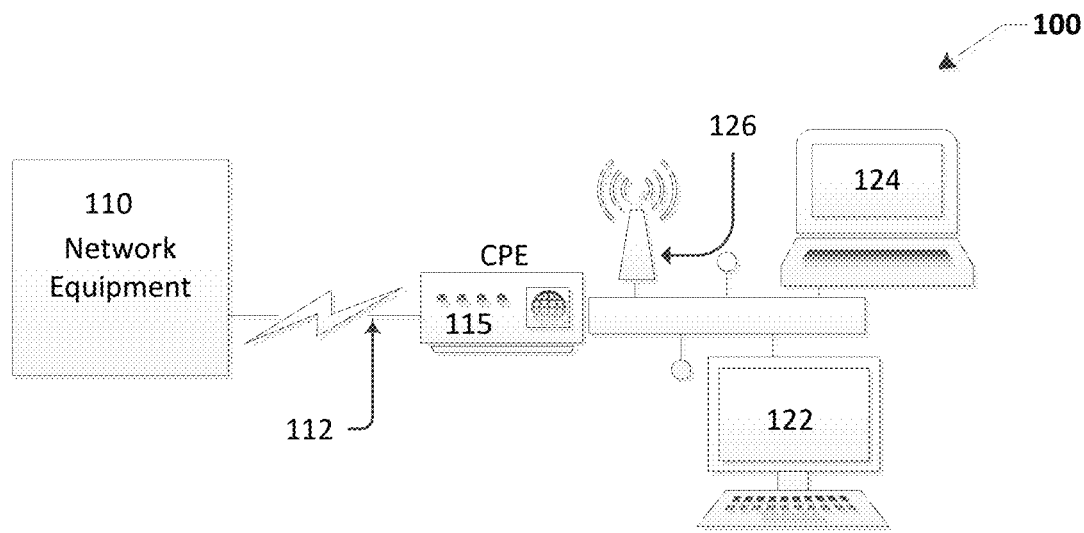
FIG. 1 shows a basic network diagram in which example embodiments of the invention may be utilized.

As shown in FIG. 1 below, a basic network 100 is shown with a network node 110, such as a cable provider Cable Modem Termination System (CMTS) or Internet service provider, which provides web access via an internet protocol (IP) interface to end user terminals 122, 124 including personal computers, laptops, wireless access points, via a network connection 112, such as a combination of optical fiber from a service provider head end to an exchange terminal, transformed from optical to electrical signals and delivered to end users, generally over a coaxial cable though inventive embodiments are in no way limited to any particular network configuration. In order to receive, demodulate, and access signals from network node 110 in the downstream via connection 112, end user terminals 122, 124, 126 may require customer premise equipment (CPE) such as a cable modem (CM) 115.

A cable modem termination system or CMTS 100 is a piece of equipment, typically located in a cable company's headend or hubsite, which is used to provide high speed data services, such as cable Internet or Voice over Internet Protocol, to cable subscribers by way of their CM.

Figure 2:
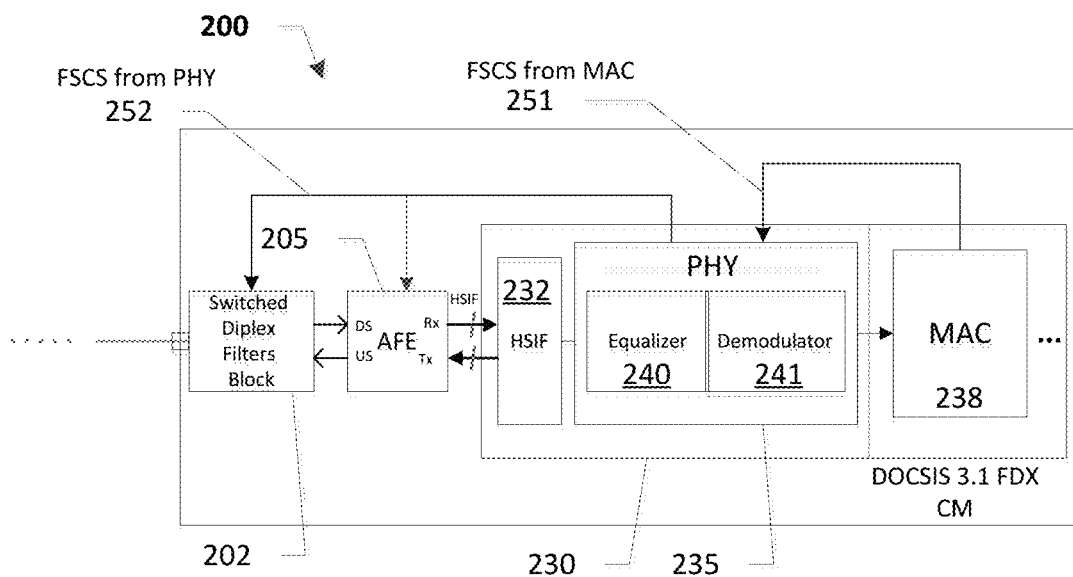
FIG. 2 shows a functional block diagram of a communication device according to various embodiments of the invention.

Referring to FIG. 2, a functional block diagram of a cable modem (CM) tuner 200 according to one or more inventive embodiments using DOCSIS 3.1 full duplexing (FDX) will now be explained.

In certain embodiments, cable modem transceiver 200 is capable of full duplex (FDX) communication with a network provider. Transceiver 200 may use a High-speed Serial Interface (HSIF) 232 to send and receive digital data between an analog front end (AFE) 205 and digital radio 230 having a physical (PHY) layer demodulator 235 and medium access layer (MAC) processing functionality 238 for decoding/encoding data between the customer premise equipment and the network provider.

As an example, the digital radio 230 may be implemented in some embodiments, as a System on a Chip (SoC) which includes networking functions including medium access control (MAC) and PHY layer functionality, e.g., demodulation and decoding, packet construction/deconstruction, etc. Transceiver 200 further may include an analog front end (AFE) 205 which, in certain embodiments, may comprise a full spectrum sampling tuner that integrates low noise amplifier (LNA)/automatic gain control (AGC), analog-to-digital conversion (ADC), channelizers and, if desired, a high speed serial interface HSIF in the front end. On the analog I/O side of the AFE 205, a block of switchable diplex filters 202 may be included and collectively are referred to in some areas this disclosure as the "tuner."

In certain embodiments the filter block 202 includes a filter switching module with a feedback/input port (logical or physical) to enable selection of which filter paths are active based on signaling received. The digital radio includes a filter compensation equalizer 240 prior to the demodulator to adapt the equalizer coefficients in a synchronous manner with the filter switching to reduce the above mentioned receiver issues due to resource block allocation changes. In this configuration, when a resource allocation is changed by the CMTS, the MAC 238 may send a filter switch control signal 251 to the PHY 235 which in turn sends a filter switch control signal 252 to filter block 202 to effect the filter path change.

Figure 3:
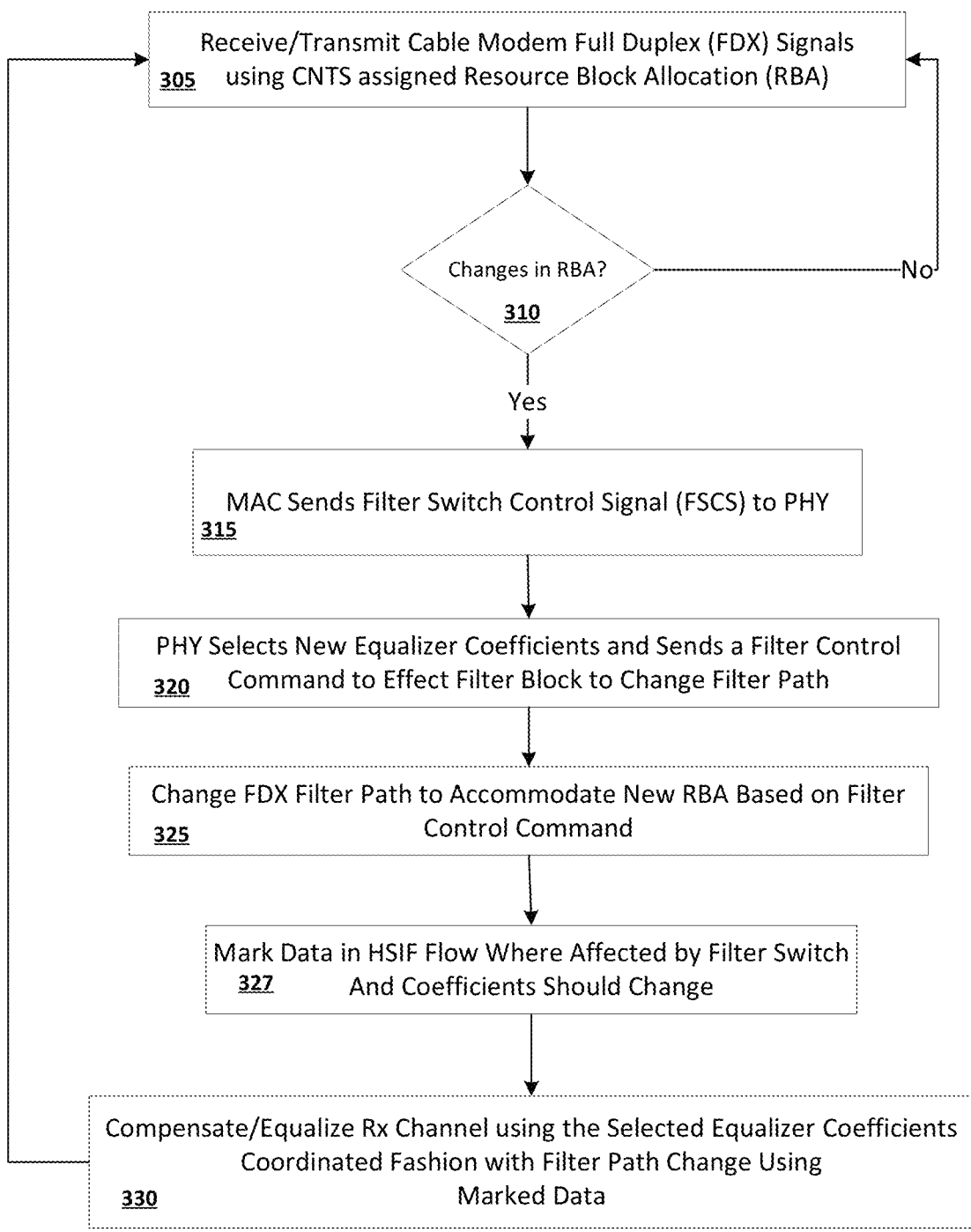
FIG. 3 shows a process for synchronizing filter changes and channel equalizer coefficients according to one or more embodiments of the invention.

A method of communication according to certain embodiments, is shown in reference to FIG. 3 based on the functional block architecture shown in FIG. 2. An incoming signal is received at the cable modem via a coaxial connector, e.g., an F-connector, and is routed to one of the filtering paths corresponding to the present FDX resource assignment allocations specified by the network, e.g., designated path of the switchable filter corresponding to the present resource block allocation. The filtered signal is then sampled, digitized and digitally down-converted. The samples (I/O) are then transferred to the receiver PHY/demodulator 230 over high-speed serial interface (HSIF) 232, using one or more lanes and a dedicated framing structure/protocol, although the inventive embodiments are not limited to the HSIF described herein.

The block of switchable filters 202 is set to a specific filter (also referred to generically herein as "filter path" or "filter configuration") based on a Filter Switch Control Signal (FSCS 252); FIG. 2. In various embodiments, a first FSCS 251 comes from the cable modem MAC processor 238 based in accordance with Resource Block Allocation (RBA) instructions provided by the CMTS (Cable Modem Termination System). That is, the MAC layer sends 315 the filter switch control signal 251 to the PHY according to received commands from the network regarding RBA changes (FIG. 3; 305, 310).

Although not necessary, it is assumed in this disclosure that the equalizer coefficients which should be used with each RBA (and therefore each possible filter switch configuration) are pre-known, e.g. from factory characterization/calibration or field calibration, referred to as "calibration data." When a switch of equalizer coefficients occurs because of RBA changes, there may also be a need to compensate the coefficients for temperature changes etc. These adjustment calculations do not affect the timing synchronization but should finish by the time the new RBA equalizer coefficients are to be loaded, to minimize time of use of the coefficients that may not be accurate.

The RBA change is typically controlled by commands from the CMTS 305. The CMTS messages are on the MAC layer, therefore it's the MAC sub-system that is aware of the channel configuration change 310. The MAC layer may or may not be tightly coupled to the tuner system timing. Therefore, a cable modem using DOCSIS 3.1 FDX or comparable protocols, may be given an "opportunity window" by the CMTS to change the filters used, during which the resource block is generally not receiving on downstream and not transmitting on upstream. Generally, the compensation for the physical channel response characteristics and current temperature, i.e., selecting or determining equalization coefficients is applied at the PHY level, which is highly synchronized, as compared to the MAC layer functionality.

An example process and the order of events of RBA initiating switchable filtering is as follows:

The MAC layer receives 305 a channel configuration change instruction from the network provisioning entity. The MAC of the cable modem generates its own filter switch control signal and sends 315 to the PHY to re-configure the FDX filter within the opportunity window. During this window, the PHY must identify 320 any required changes in equalizer coefficients to compensate for RBA changes and, if desired adjust the coefficients for changes in platform temperature. In certain embodiments, the PHY will also send a filter switch control signal to effect the block of switchable filters. In the embodiment shown in FIG. 2, this PHY sends the filter switch control signal to the filter block (202) and to AFE (205). In other embodiments, the filter switch control signal is sent from the PHY of the digital radio to the AFE, and the AFE may signal the filter block to change 325 its configuration. Various alternative signaling options for communicating a filter path change from the MAC can be made based on the particular architecture and system design used without departing from the scope of the inventive embodiments.

In most cases, the filter switching will have some "switch delay" and some "transient" response time until the response is settled at its steady state. In certain embodiments, adapting or changing the equalizer coefficients to match the filter path change (referred to herein as "synchronizing," or time "coordination") can be near instant or delayed by a predefined time period. Throughout these stages the ADC in the AFE continues sampling the input received from the network and performing digital signal processing. The processed data is then framed and sent over HSIF to the demodulator (note: this path may also include some buffers/FIFO or other functional circuitry not shown as deemed discretionary). This gives rise to enable marking 327 the timing in the data at which a coefficient change should be made, by designating in the sampled data across HSIF for new samples filtered with the updated filter path. At 330, the marked I/O data samples filtered with the new FDX configuration arriving at the digital radio will allow the changes the coefficients of the equalizer from those selected at step 320.

According to certain inventive embodiments of synchronizing the timing of the coefficients change in PHY to the arrival of the affected samples to the PHY using a specific format of indication from the tuner will now be explained in reference to FIGS. 4-7.

Figure 4:
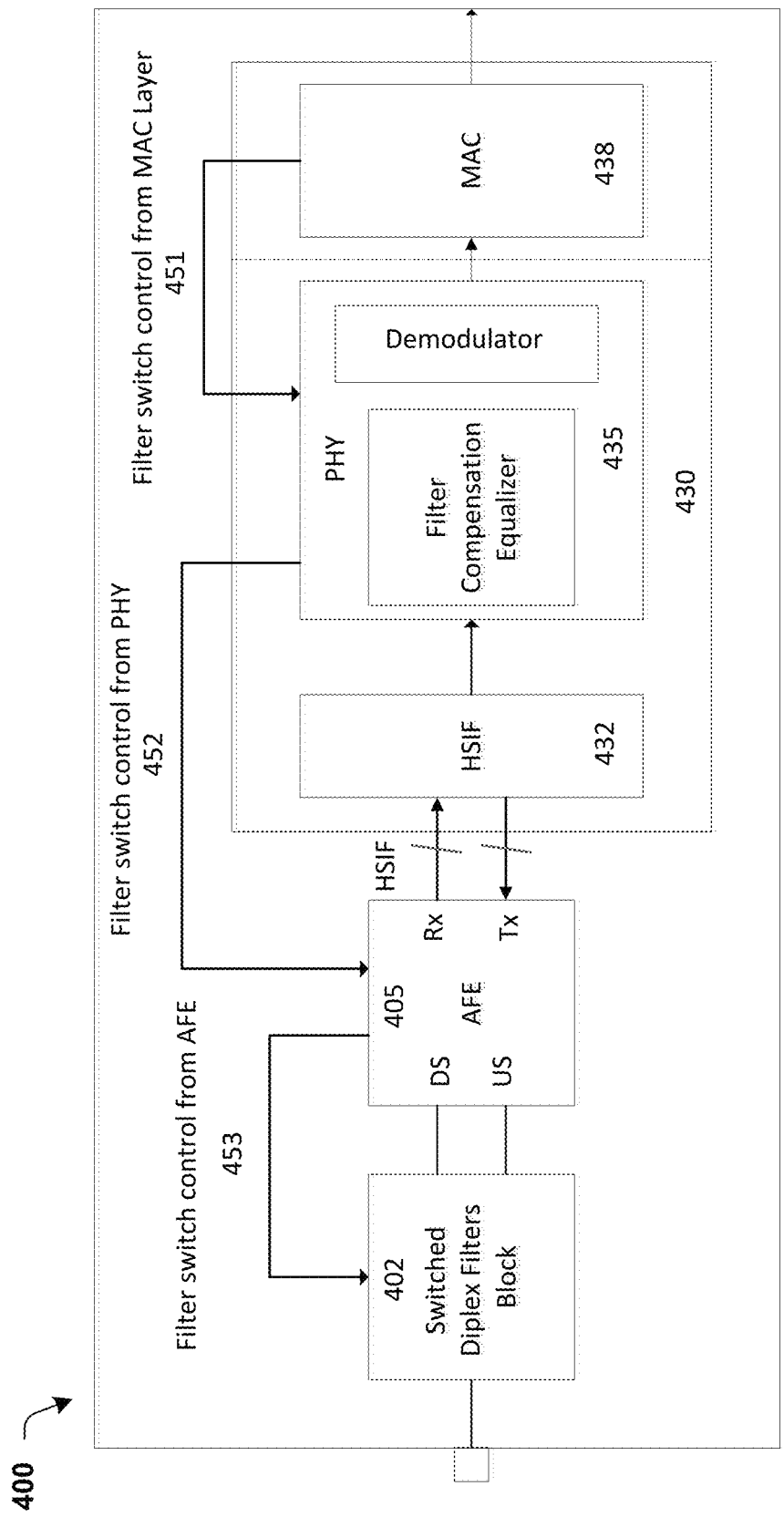
FIG. 4 shows a functional block diagram of a communication device according to an alternate embodiment.

FIG. 4 shows a functional block diagram of varying embodiments of a cable modem transceiver 400 which includes a switched filter block 402, an analog front end (AFE) 405 in communication with a digital radio 430 through a high speed serial interface (HSIF) 432 similar to prior embodiments. It is noted, that in some instances herein, the filter block, AFE and their side of the HSIF, may be collectively referred to herein as "tuner," though not limited in any manner by such reference. In this embodiment, there is a filter switch control signal 440 from the MAC 438 to the AFE 405. The AFE 405 uses the MAC signaling 440 to control the switching filter block 402.

Figure 5:
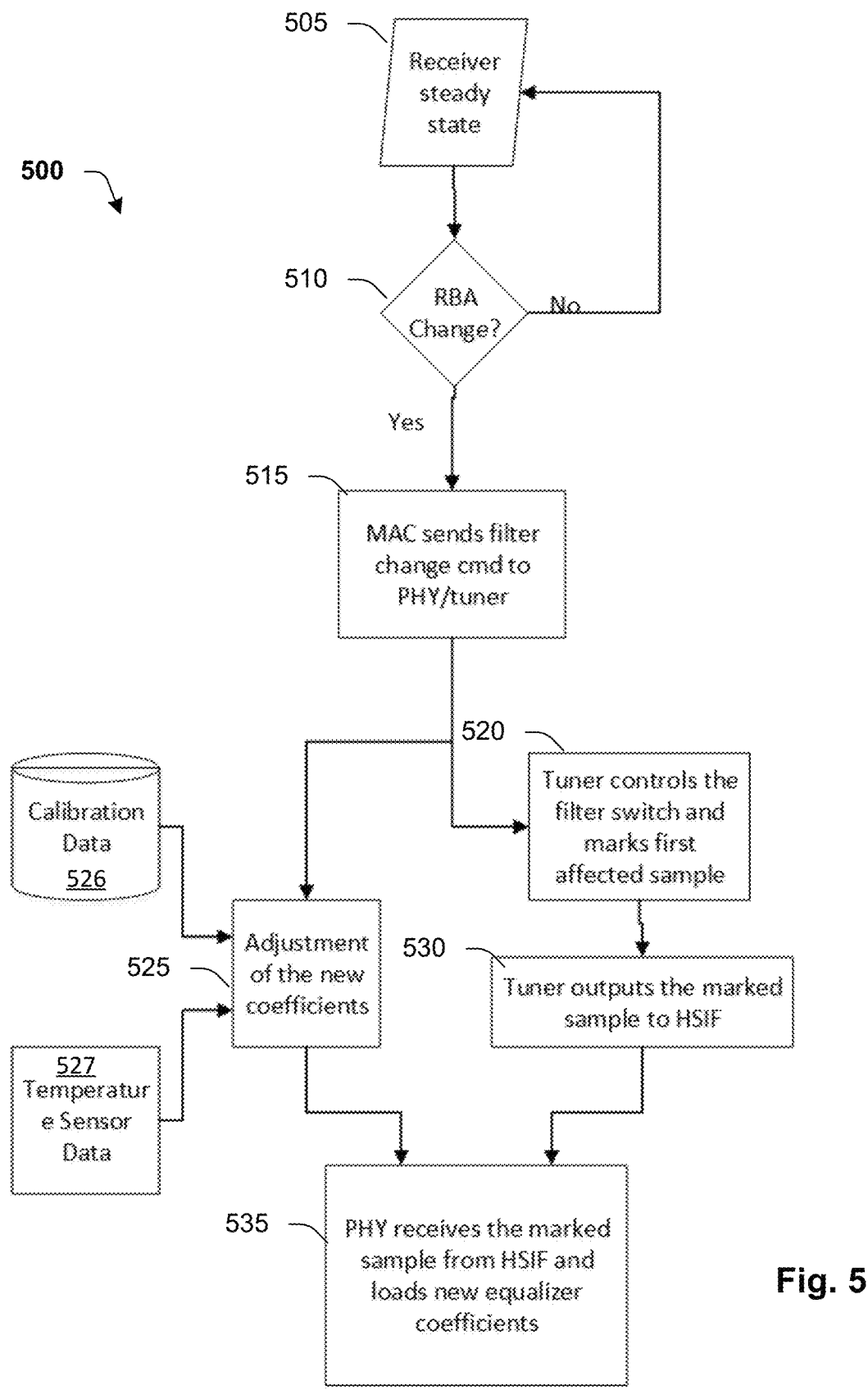
FIG. 5 shows another method of synchronizing filter changes and equalizer coefficient updates in an FDX system according to the inventive embodiments.

In operation, referring to FIG. 5, the transceiver begins in a steady state 505, and when the resource block allocation (RBA) command from the CMTS is received 510 by the MAC sub-system, instead of directly controlling the filter switch the MAC passes 515 the switch control command to the AFE or tuner, either by general purpose input/output (GPIO) lines or via a control interface, as in the system architect's discretion. The AFE knows the exact moment when the switching command is output on the switch control lines and "marks" 520 the sample (or small group/range of samples) with a flag (e.g., a binary mark or for example with the specific filter configuration identifier) or some other similar mechanism. The tuner then propagates 530 that mark (referred to herein as "synchronizing filter channel mark") together with the sample or group of samples throughout the digital signal processing. This enables the location, or a point of reference, of the first sample(s) that were affected by the filter path change to be known.

When the samples, which may be real spectrum samples, or complex I/O channel samples, are sent over the high speed interface to the PHY, the HSIF frame that has the marked sample will carry an indication to enable the PHY to recognize the marked sample. When the demodulator receives 535 the marked sample, it can change the coefficients starting from this sample and on and synchronization is attained without receiver performance degradation or data loss. In some embodiments, the demodulator can adjust the coefficient changes 525 from pre-stored calibration memory or table 526 and, if desired, modified by sensor input 527, such as for thermal conditions.

In certain embodiments, it may be possible to interpolate or even characterize the response during the transient, in addition to the known response at steady states. Depending on the signal processing implementation, a single marked time-domain spectrum sample may be later represented by a group of I/O samples, possibly on multiple channels.

Figure 6:
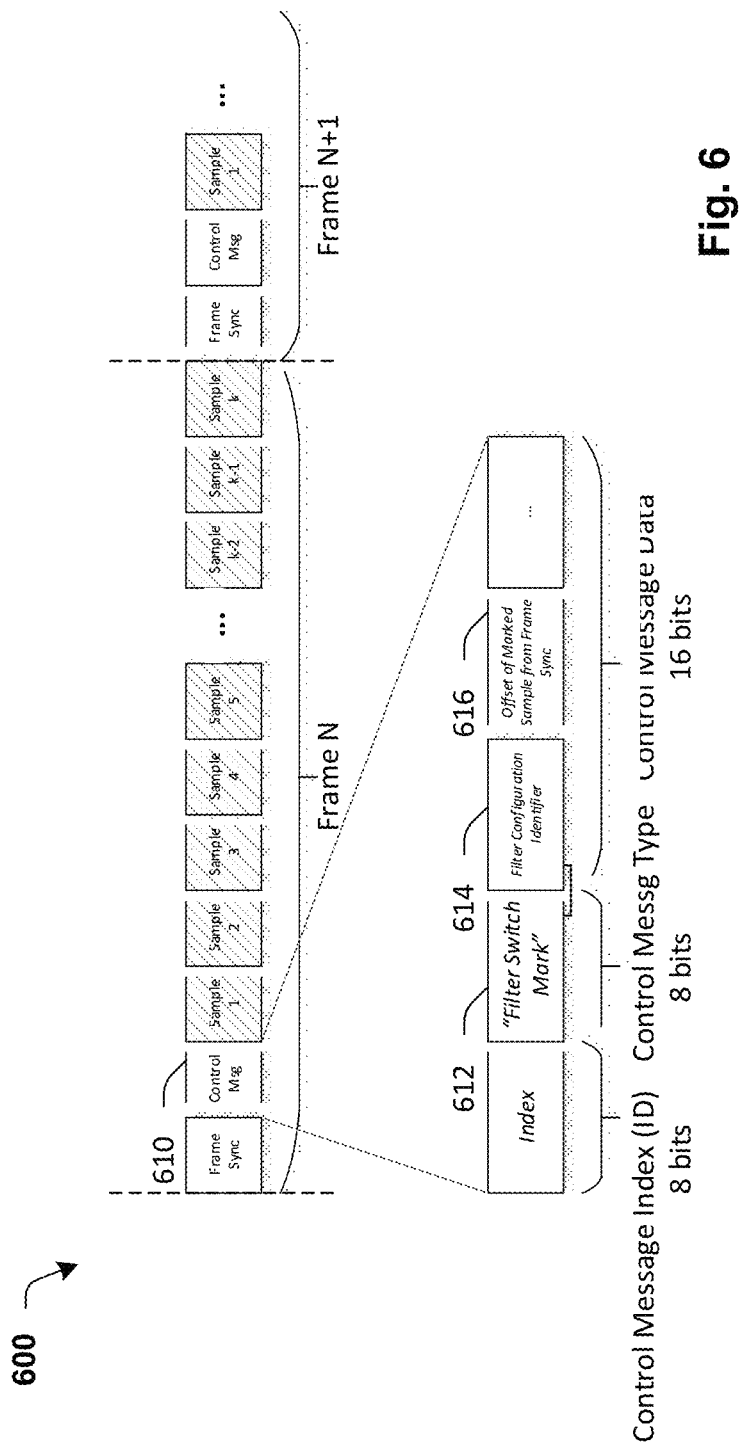
FIG. 6 shows an example frame synchronization example for synchronizing filter changes and equalizer coefficients according to some embodiments.

Referring to FIG. 6, the samples may be transferred from the AFE tuner to PHY over HSIF interface that uses a framing structure 600 as shown, which frames the sample data and optionally additional control data.

In some non-limiting embodiments, the frame structure 600 may include a control message 610 may include a control word which may comprise: a control word ID (to align between PHY and/or MAC processing and the AFE), control message type, and control word data wherein the data may depend on the type of message. In case of a filter change, the frame includes a filter switch sample mark 612. In some embodiments, data could include the identifier 614 of the used filter configuration and the pointer 616 to the first marked sample within the frame. Various combinations and alternative messaging formats are also contemplated and the inventive embodiments are not limited to any particular format or sequence.

For example, other considerations for one of ordinary skill in the art may consider whether the control messages may or may not appear in each frame; the number of bits allocated for different parts of the control messaging; whether the size in bits of the control messages may or may not be constant. The specific designs or optimal filter switch timing decision may be implementation dependent.

Figure 7:
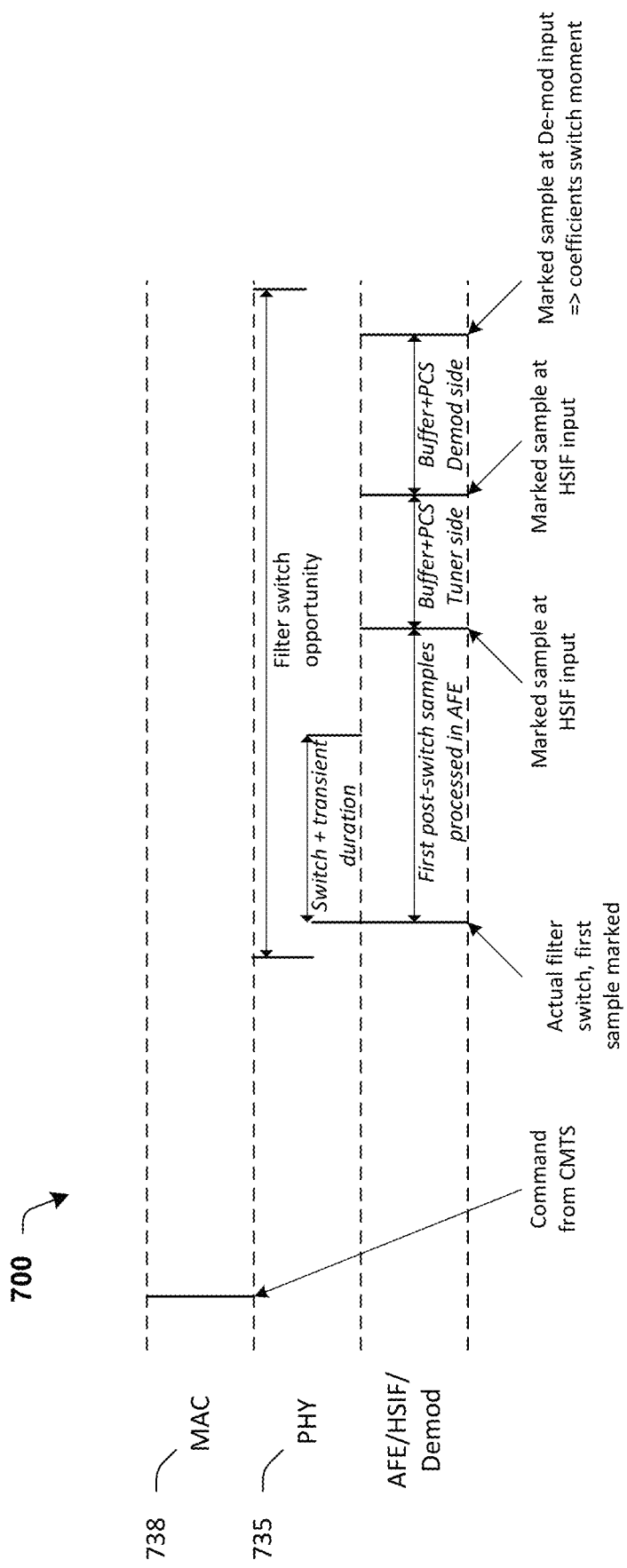
FIG. 7 shows an example timing diagram for signaling and switching interaction between various elements of an FDX cable modem system according to various embodiments.

FIG. 7 shows and example timing sequence 700 for interaction between the PHY 735 and MAC 738. The sequence 700 shows an example from the point at which the CMTS command to change the filter path/RBA allocation is received, to the end point during the opportunity window at which the coefficient change should be made. This includes the filter switching, the marking of samples by the tuner during HSIF framing of data and receipt of the data at the PHY HSIF deframing The foregoing description of architecture and processing for the digital radio may be implemented as a system on a chip (SoC) receiver for cable modems using DOCSIS 3.1 Hybrid Fiber Coax FDX standard although it is not limited thereto. Specific hardware and software implementations for functional block filter switching synchronization elements discussed herein, may include designs in application specific integrated circuits (ASICs), micro-controllers, programmable logic arrays, and/or as software/firmware to perform the processes described herein. In one example embodiments, filter switching signal, synchronization and messaging may be programmed in software instructions and executed, or caused to be when in operation, by the processor, or central processing unit (CPU) attached to the hardware demodulator.

Figure 8:
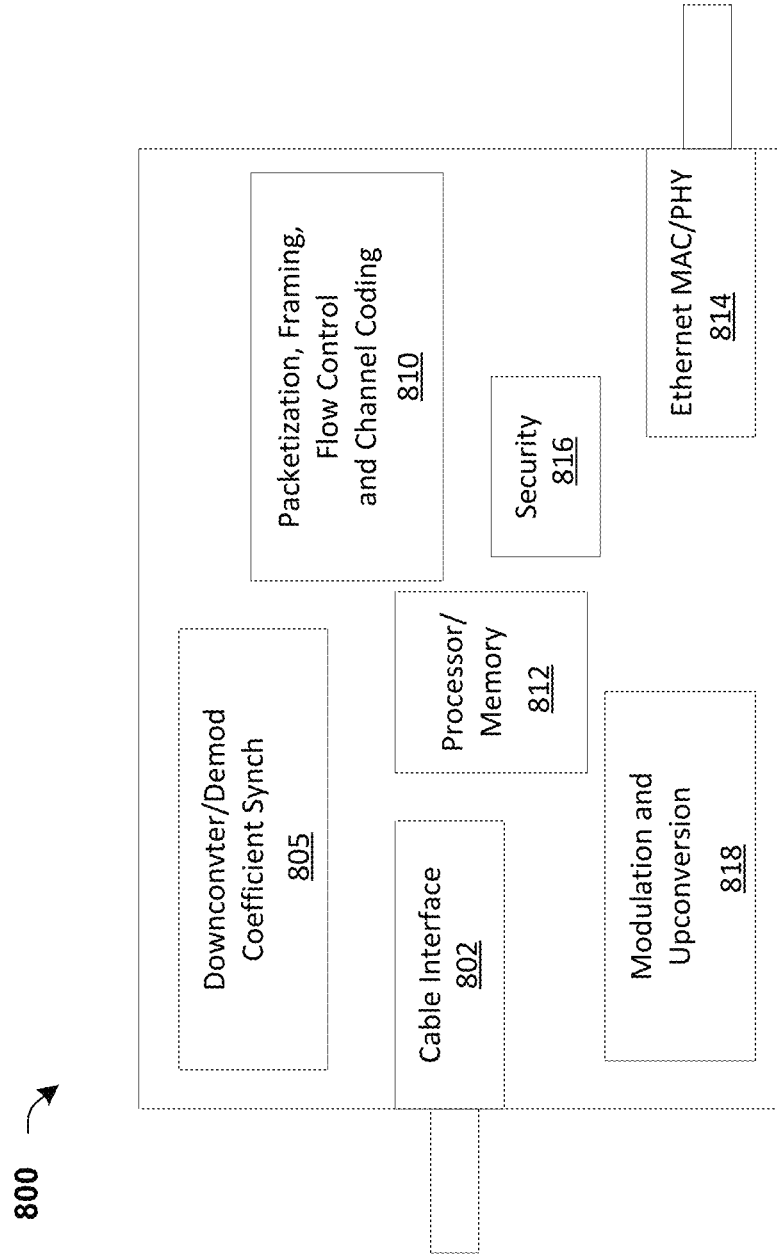
FIG. 8 shows an example functional block diagram of a modem including an analog front end and receiver of one or more embodiments of the invention.

Referring to FIG. 8, an example functional block diagram of a modem 800 for filter switching and time synching equalization coefficients may include a receive interface 802 adapted to receive a wired or wireless signal into the modem, a downconverter/demodulator/de-coder circuit 805 PHY having the capabilities as described herein, and a modulator/upconverter circuit 818 for sending signals upstream via any type of desired PHY layer protocols.

In certain example embodiments, modem 800 may further include various other functional elements such as communications management circuit 810 to construct or de-construct packetization, framing, manage flow control and channel coding/decoding of incoming or outgoing communication protocols as suitable for unidirectional or bi-directional data communication with the PHY layer or higher layer levels of the OSI communications model, a processor/memory 812 adapted to control or provide processing/storage for various other functional elements of modem 800 as desired. Furthermore, modem 800 may include security functionality 816 and client/user interface functionality 814, such as 10/100 Gb based Ethernet PHY/MAC processing and respective interface(s) to provide a user TCP/IP layer interface connectivity. It should be understood that modem 800 is only a representational functional example and various additional functionalities may be included as desired or those functionalities shown omitted if not needed or desired as known by one of ordinary skill in the art. Thus the specific example depicted and described is not intended to limit the embodiments of the invention in any manner.

DOCSIS 3.1 FDX been engineered by CableLabs and partners to increase the multi-gigabit data era on existing Hybrid Fibre-Coax (HFC) networks through improved spectral efficiency. Those of skill in the art would recognize modifications and substitutions of the elements, components and circuits described herein and possible and the invention is not limited to the specific examples in the detailed description but rather by the appended claims.

EXAMPLE EMBODIMENTS

A First Example embodiment includes a cable modem having an analog front end (AFE), a PHY and MAC, that operates in full duplex (FDX) mode, and having a switchable filter block and variable equalizer coefficients in the PHY, a processor configured to: receive a command by the medium access control (MAC) from the cable modem; and trigger the MAC to send a filter switch control signal to the analog front end based on the received command to; cause the AFE, in response to the filter switch control signal, to switch a filter path and insert a filter switching mark in one or more samples received; and cause the PHY to change its variable equalizer coefficients to reflect current calibration data for the switched filter path in substantial synchronization with receiving samples including the filter switching mark from the AFE.

A Second Example further defines the First wherein the received command comprises a resource block allocation (RBA) change from a cable modem termination system (CMTS).

A Third Example further defines the First or Second wherein the cable modem is a data over cable service interface specification (DOCSIS) 3.1 FDX compliant modem.

A Fourth Example further defines the First wherein the filter switching mark is inserted with the one or more samples received and passed from the AFE to the PHY via a high speed serial interface framing structure.

In a Fifth Example Embodiment, the processor of the Fourth Example is further defined wherein the filter switching mark includes a filter configuration identifier corresponding to the switched filter path and an offset of the marked sample from a frame synchronization portion of the framing structure.

In a Sixth Example Embodiment, the processor of the First Example is furthered by the calibration data including pre-determined equalizer coefficients that match any available filter path that may be selected.

A Seventh Example further defines the processor of the Second or Fourth through Sixth Examples wherein the calibration data includes adjustment of the pre-determined equalizer coefficients for temperature changes.

An Eighth Example Embodiment defines a communication system comprising: a block of switchable filters to receive and transmit full duplex (FDX) signals according to a network provided resource block allocation (RBA) protocol; and a tuner system in communication with the block of switchable filters, including physical layer (PHY) and medium access control (MAC) functionality, said MAC functionality including signaling to cause the block of switchable filters to change a filter path corresponding to the provided RBA and to mark received samples when the filter path changes, and the PHY synchronizing equalizer coefficient changes to compensate for the changed filter path based on the marked samples.

A Ninth Example further defines the communication system of the Eighth Example wherein the tuner system further comprises an analog front end (AFE) to receive the MAC signaling, cause the filter path change in the block of switchable filters and mark the received samples using an interface and framing structure to communicate the marked samples to the PHY.

In a Tenth Example, the communication system of the Ninth Example is furthered where the interface comprises a high speed serial interface (HSIF) and wherein the framing structure includes a filter path change control message including a filter configuration identifier and an offset.

An Eleventh Example further defines any of the Eighth through Tenth Examples where at least a portion of the tuner system comprises a System on a Chip (SoC).

In a Twelfth Example Embodiment, the communication system of any one of the Eighth through Tenth Examples, wherein the system comprises a data over cable service interface specification (DOCSIS) 3.1 FDX compliant modem.

According to a Thirteenth Example, the Eighth Example is further defined wherein equalizer coefficient changes are selected by the PHY from pre-calibrated matching coefficients for each selectable filter path in the block of switchable filters.

A Fourteenth Example further defines any one of the Eight through Tenth or Thirteenth Examples wherein equalizer coefficient changes are adjustable by the PHY based on a temperature sensor.

A Fifteenth Example Embodiment defines a method of synchronizing filter switching and updating channel equalization coefficients in a cable modem having a switchable filter block, an analog front end (AFE), and a digital tuner including PHY and MAC functionality, the method comprising: receiving a command by the cable modem from a cable modem termination system (CMTS); and sending a filter switch control signal to the AFE from the MAC based on the received command to; cause the AFE, in response to the filter switch control signal, to switch a filter path in the switchable filter block, and insert a filter switching mark in one or more samples received; and cause the PHY to change its equalizer coefficients to compensate for the switched filter path in substantial synchronization with receiving samples including the filter switching mark from the AFE.

A Sixteenth Example Embodiment further defines the Fifteenth wherein the received command comprises a resource block allocation (RBA) change from the cable modem termination system (CMTS).

In a Seventeenth Example, the Fifteenth or Sixteenth Examples are further defined wherein the cable modem is a data over cable service interface specification (DOCSIS) 3.1 FDX compliant modem.

In an Eighteenth Example, the Fifteenth or Sixteenth Examples are further detailed by the filter switching mark being inserted with the one or more samples received and passed from the AFE to the PHY via a high speed serial interface framing structure.

The Eighteenth Example may be further defined by a Nineteenth Example in which the filter switching mark includes a filter configuration identifier corresponding to the switched filter path and an offset of the marked sample from a frame synchronization portion of the framing structure.

A Twentieth Example further defines the Fifteenth or Sixteenth Examples, wherein the PHY changes its equalizer coefficients using pre-determined equalizer coefficients that match any available filter path that may be selected.

A Twenty-First Example furthers the Twentieth wherein the PHY changes its equalizer coefficients using the pre-determined equalizer coefficients modified for sensed temperature changes.

In a Twenty-Second Example Embodiment, a system for synchronizing filter switching and updating channel equalization coefficients in a cable modem having a switchable filter block, an analog front end (AFE), and a digital tuner including PHY and MAC functionality, the system including: means for receiving a command by the cable modem from a cable modem termination system (CMTS); and means for sending a filter switch control signal to the AFE from the digital tuner based on the received command to: cause the AFE, in response to the filter switch control signal, to switch a filter path in the switchable filter block, and insert a filter switching mark in one or more samples received; and cause the PHY to change its equalizer coefficients to compensate for the switched filter path in substantial synchronization with receiving samples including the filter switching mark from the AFE.

A Twenty-Third Example further defines the Twenty-Second wherein the received command comprises a resource block allocation (RBA) change from the cable modem termination system (CMTS).

A Twenty-Fourth Example further defines the Twenty-Second or Twenty-Third, wherein the cable modem is a data over cable service interface specification (DOCSIS) 3.1 FDX compliant modem.

According to a Twenty-Fifth Example, the Twenty-Second or Twenty-Third Example Embodiments may be further defined, wherein the filter switching mark is inserted with the one or more samples received and passed from the AFE to the PHY via a high speed serial interface framing structure.

A Twenty-Sixth Example may further the Twenty-Fifth, wherein the filter switching mark includes a filter configuration identifier corresponding to the switched filter path and an offset of the marked sample from a frame synchronization portion of the framing structure.

In a Twenty-Seventh Example, the system of the Twenty-Second or Twenty-Third are furthered, wherein the PHY changes its equalizer coefficients using pre-determined equalizer coefficients that match any available filter path that may be selected.

A Twenty-Eighth Example furthers the Twenty-Seventh, wherein the PHY changes its equalizer coefficients using the pre-determined equalizer coefficients modified for sensed temperature changes.

A Twenty-Ninth Example embodiment furthers the processor of any of the First through Third Examples, wherein the filter switching mark is inserted with the one or more samples received and passed from the AFE to the PHY via a high speed serial interface framing structure.

A Thirtieth Example further defines the Twenty-Ninth, wherein the filter switching mark includes a filter configuration identifier corresponding to the switched filter path and an offset of the marked sample from a frame synchronization portion of the framing structure.

A Thirty-First Example Embodiment further defines that of the First through Fifth Examples, wherein the calibration data includes pre-determined equalizer coefficients that match any available filter path that may be selected.

A Thirty-Second Example Embodiment furthers the processor of the First through Fifth Examples, wherein the calibration data includes adjustment of the pre-determined equalizer coefficients for temperature changes.

According to a Thirty-Third Example, the method of the Eighteenth through Twentieth Examples further include, wherein the filter switching mark is inserted with the one or more samples received and passed from the AFE to the PHY via a high speed serial interface framing structure.

In a Thirty-Fourth Embodiment, the Thirty-Third Example is furthered, wherein the filter switching mark includes a filter configuration identifier corresponding to the switched filter path and an offset of the marked sample from a frame synchronization portion of the framing structure.

A method of the Thirty-Fifth Example furthers those of the Eighteenth through Twentieth and Thirty-Third through Thirty Fourth, wherein the PHY changes its equalizer coefficients using pre-determined equalizer coefficients that match any available filter path that may be selected.

A Thirty-Sixth Example Embodiment further defines that of the Thirty-Fifth, wherein the PHY changes its equalizer coefficients using the pre-determined equalizer coefficients modified for sensed temperature changes.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable, firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

The invention claimed is:

1. In a cable modem having an analog front end (AFE), a physical layer modulator (PHY) and a medium access control circuitry (MAC), that operates in full duplex (FDX)

mode, and having a switchable filter block and variable equalizer coefficients in the PHY, a processor configured to:
receive a command at the MAC from the cable modem, wherein the received command comprises a resource block allocation (RBA) change, wherein the RBA change comprises altering a first allocation of downstream and upstream transmission channels to a second, different allocation of downstream and upstream transmission channels, wherein altering the allocation comprises changing a channel from a downstream transmission direction to an upstream transmission direction, or vice-versa; and
trigger the MAC to send a filter switch control signal to the AFE based on the received command to:
cause the AFE, in response to the filter switch control signal, to switch a filter path and insert a filter switching mark in one or more samples received; and
cause the PHY to change its variable equalizer coefficients for the switched filter path in substantial synchronization with receiving samples including the filter switching mark from the AFE.

2. The processor of claim 1 wherein the cable modem is a data over cable service interface specification (DOCSIS) 3.1 FDX compliant modem.

3. The processor of claim 1 wherein the filter switching mark is inserted with the one or more samples received and passed from the AFE to the PHY via a high-speed serial interface framing structure.

4. The processor of claim 3 wherein the filter switching mark includes a filter configuration identifier corresponding to the switched filter path and an offset of the marked sample from a frame synchronization portion of the framing structure.

5. The processor of claim 1 wherein the variable equalizer coefficients reflect a calibration data determined by a characterization of a signal response during a transient, wherein the transient represents a real-time characterization of the signal response.

6. The processor of claim 1 wherein the variable equalizer coefficients reflect a pre-determined calibration data.

7. A communication system comprising:
a block of switchable filters to receive and transmit full duplex (FDX) signals according to a network provided resource block allocation (RBA) protocol; and
a tuner system in communication with the block of switchable filters, including physical layer (PHY) and medium access control (MAC) functionality, said MAC functionality including signaling to cause the block of switchable filters to change a filter path corresponding to a change in RBA and to mark received samples when the filter path changes, and a PHY synchronizing equalizer coefficient changes to compensate for the changed filter path based on the marked samples,
wherein the equalizer coefficient changes are selected by the PHY from a characterization data of a signal response during a transient, wherein the transient represents a real-time characterization of the signal for a switched filter path,
wherein the RBA change due to the signaling comprises altering a first allocation of downstream and upstream transmission channels to a second, different allocation of downstream and upstream transmission channels, wherein altering the allocation comprises changing a channel from a downstream transmission direction to an upstream transmission direction, or vice-versa.

8. The communication system of claim 7 wherein the tuner system further comprises an analog front end (AFE) to receive the MAC signaling, cause the filter path change in the block of switchable filters and mark the received samples using an interface and a framing structure to communicate the marked samples to the PHY.

9. The communication system of claim 8 wherein the interface comprises a high speed serial interface (HSIF) and wherein the framing structure includes a filter path change control message including a filter configuration identifier and an offset.

10. The communication system of claim 7 wherein at least a portion of the tuner system comprises a System on a Chip (SoC).

11. The communication system of claim 7 wherein the communication system comprises a data over cable service interface specification (DOCSIS) 3.1 FDX compliant modem.

12. The communication system of claim 11 wherein equalizer coefficient changes are adjustable by the PHY based on characterization of the signal response during the transient that include temperature changes.

13. A method of synchronizing filter switching and updating channel equalization coefficients in a cable modem having a switchable filter block, an analog front end (AFE), and a digital tuner including physical layer (PHY) and medium access control (MAC) functionality, the method comprising:
sending a filter switch control signal to the AFE from the MAC based on a received command to;
cause the AFE, in response to the filter switch control signal, to switch a filter path in the switchable filter block, and insert a filter switching mark in one or more samples received; and
cause the PHY to change its equalizer coefficients to compensate for a switched filter path coefficients from a characterization data of a signal response during a transient, wherein the transient represents a real-time characterization of the signal in substantial synchronization with receiving samples including the filter switching mark from the AFE,
wherein the received command comprises a resource block allocation (RBA), and wherein the RBA change comprises altering a first allocation of downstream and upstream transmission channels to a second, different allocation of downstream and upstream transmission channels, wherein altering the allocation comprises changing a channel from a downstream transmission direction to an upstream transmission direction, or vice-versa.

14. The method of claim 13 wherein the cable modem is a data over cable service interface specification (DOCSIS) 3.1 FDX compliant modem.

15. The method of claim 13 wherein the filter switching mark is inserted with the one or more samples received and passed from the AFE to the PHY via a high speed serial interface framing structure.

16. The method of claim 15 wherein the filter switching mark includes a filter configuration identifier corresponding to the switched filter path and an offset of the marked sample from a frame synchronization portion of the framing structure.

17. The method of claim 13 wherein the received command at the cable modem comprises the RBA change from a cable modem termination system (CMTS).

18. The method of claim 13 wherein the PHY changes its equalizer coefficients using the equalizer coefficients from the characterization of the signal response during the transient that include temperature changes.

19. The processor of claim 1 wherein the RBA receives commands from a cable modem termination system (CMTS).

20. The processor of claim 6 wherein the pre-determined calibration data includes adjustment for temperature changes.

\* \* \* \* \*